Feb. 28, 1933.                R. SIMPSON                    1,899,885
                    ELECTRICAL MEASURING INSTRUMENT
                        Filed Oct. 22, 1930        2 Sheets-Sheet 1
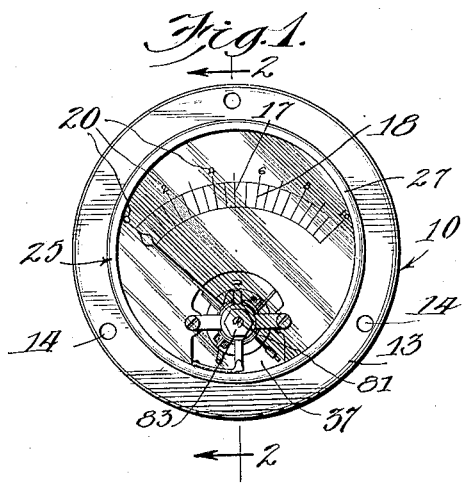
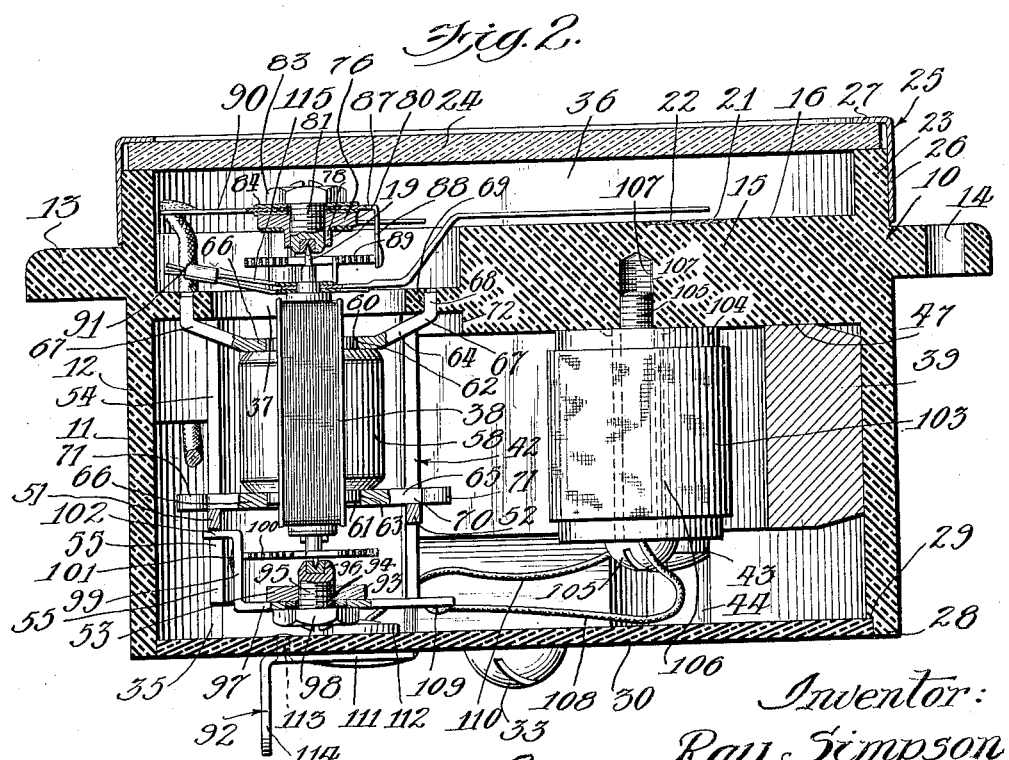
Inventor:
Ray Simpson
By Williams, Bradbury,
McCaleb & Hinkle
Attys

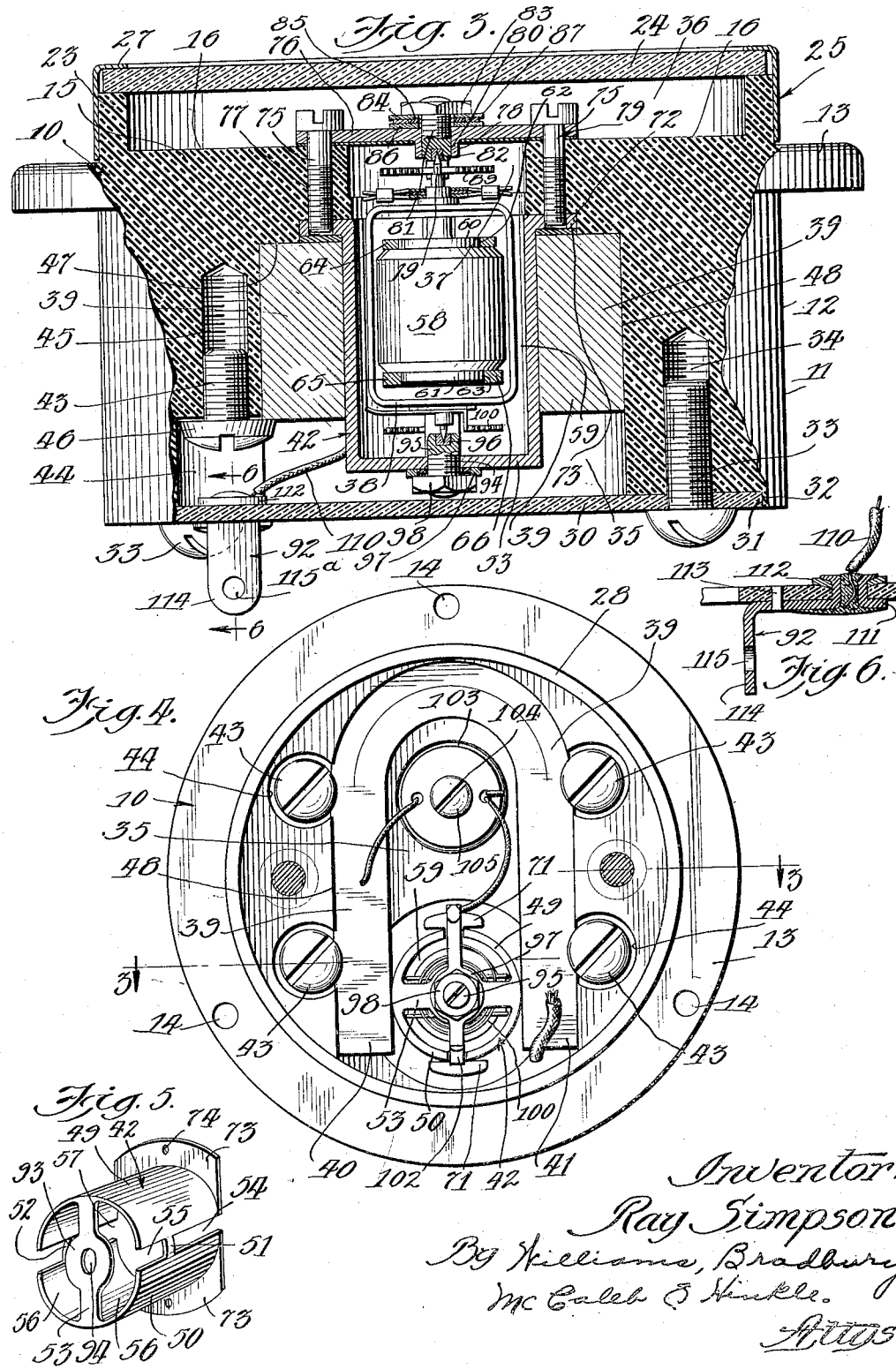

Patented Feb. 28, 1933

1,899,885

UNITED STATES PATENT OFFICE

RAY SIMPSON, OF RIVER FOREST, ILLINOIS, ASSIGNOR, BY MESNE ASSIGNMENTS, TO JEWELL ELECTRICAL INSTRUMENT COMPANY, A CORPORATION OF NEW JERSEY

ELECTRICAL MEASURING INSTRUMENT

Application filed October 22, 1930. Serial No. 490,415.

The present invention relates to electrical measuring instruments, and is particularly concerned with instruments of the moving coil type.

Some of the features of the invention, however, such as the construction of the casing, are of general application to all kinds of instruments, or to other types of electrical instruments or devices, and I do not wish to limit the invention to the particular type of instrument which has been selected to illustrate the invention.

One of the objects of the invention is the provision of an improved electrical measuring instrument, which is capable of being constructed more economically than the devices of the prior art, which accomplishes a high degree of accuracy of measurement, and which is capable of highly satisfactory service in every respect.

Another object is the provision of an improved pole piece structure for magnetic devices, by means of which a more uniform and accurate air gap may be attained, without machining operations, and the provision of pole pieces which lend themselves readily to manufacture by drawing and punching operations, thereby reducing the cost of manufacture.

Another object is the provision of an improved instrument assembly and casing structure, whereby the necessity for a separate dial plate is eliminated, and the instrument simplified so as to reduce very substantially the cost of manufacture.

Another object is the provision of an improved instrument, having the dial or scale formed as an integral part of the support formed as an integral part of the casing, whereby the usual metal dial plate and its attaching screws may be eliminated, as well as the labor of machining and assembling these parts, and the instrument may be provided with a casing and a dial formed in a single molding operation.

Another object is the provision of an improved field structure, which requires a minimum of machine work in its manufacture, and consequently also requires less heat treatment, since the magnet need not be softened or annealed for drilling operations or the like.

Another object is the provision of an improved casing and mode of support for the mechanism of an instrument of the class described, by means of which the necessity for further machine operations relating to the securement of the mechanism is eliminated.

Another object is the provision of an improved mode of securing pole pieces or other magnetic parts to a magnetic field structure with a minimum amount of labor.

Another object is the elimination of expensive machining operations so far as practicable, from the manufacture of electrical measuring instruments of the class described, by the provision of a more simple structure and improved modes of assembly and organization of the elements of the instrument.

Another object is the provision of an instrument of the class described, which can be completely assembled before the adjustment or calibration of the series or shunt resistance is accomplished, so as to assure a more accurate adjustment and to assure the maintenance of the calibration secured.

Another object is the provision of an improved instrument structure and assembly, most of the parts of which lend themselves readily to manufacture by stamping or molding operations and to assembly with a minimum of machining or threading operations.

Another object is the provision of an improved electrical measuring instrument which is readily adaptable for constructing the various types of instruments, such as ammeters, voltmeters, etc.

Other objects and advantages of the invention will be apparent from the following description and from the accompanying drawings, in which similar characters of reference indicate similar parts through out the several views.

Referring to the drawings, of which there are two sheets;

Fig. 1 is an elevational view of the face of an instrument constructed according to the present invention;

Fig. 2 is an enlarged sectional view taken on the plane of the line 2—2 of Fig. 1, looking in the direction of the arrows;

Fig. 3 is a similar sectional view taken on the plane of the line 3—3 of Fig. 4, looking in the direction of the arrows;

Fig. 4 is a rear elevational view with the cover removed;

Fig. 5 is an enlarged view in perspective of the pole piece unit.

Fig. 6 is a section taken on the line 6—6 of Fig. 3.

The instruments covered according to the present invention, are preferably provided with a casing indicated in its entirety by the numeral 10, which is formed by molding the same of insulating material, such as a phenolic condensation compound, and while the casing selected for illustration is a flush-type casing adapted to be placed in an aperture in a supporting panel, the casing may also be made in the front-of-board type.

For reasons of economy of material, the casing 10 is preferably provided with side walls 11 having a substantially cylindrical outer surface 12 and with a supporting flange 13 which may be provided with apertures 14 for receiving screw bolts or other convenient fastening means.

In order to eliminate the manufacturing operations necessitated by the construction and installation of a separate dial plate, one end of the casing 10 is preferably closed by an integral end portion 15 having a flat outer surface 16 adapted to serve as a dial plate, or as a support for a dial. In some embodiments of the invention, a single indication mark 17 will be sufficient where it is necessary to indicate only one value of current or voltage, and under such conditions, the single scale mark is preferably placed near the center of the dial. The end portion 15 is preferably provided with a complete scale 18, comprising a plurality of division marks 17 extending radially from the axis of the spindle 19 and with a plurality of numerical indicia 20 of the usual type.

Many of the features of the invention may be realized by merely pasting a paper dial on the flat surface 16 of the end 15, but the present dial is preferably formed by providing molding formations on the die, which is used to mold the casing member 10, and the molding formations form a plurality of relatively narrow grooves 21, the grooves corresponding to the representation of the scale 18 and the numbers 20, shown in Fig. 1.

The grooves 21 may be made as wide as it is desired to make the printing or lines of the scale, and after the molding operation has been completed, the grooves 21 are preferably filled with material 22 of a contrasting color, such as white printer's wax, and as the molded casing its usually of darker material, the scale 18, which is formed by the grooves 21, is readily made visible by the filler 22.

In order to provide the casing 10 with scale formations molded integrally in the material of the casing 10, the die with which the casing is molded, may be suitably engraved so that the scale 18 shown in Fig. 1, stands out in relief upon the surface of the dial, and is adapted to form the grooves 21 in the face 16 of the end 15.

The casing 10 is preferably provided with an upwardly projecting annular wall 23 around the dial portion 16 and adapted to support the cover plate 24 of transparent material such as glass, in spaced relation to the dial surface 16.

The glass cover plate 24 is preferably circular in form and may be secured in place by a bezel ring 25 having a cylindrical portion 26 adapted to frictionally fit on the outer cylindrical surface of the annular wall 23, and the bezel ring 25 is also provided with an inwardly extending annular flange 27 adapted to engage the glass cover plate 24.

The casing 10 is also preferably provided with an annular wall 28 at its rear end, the rear end being open and provided with an annular shoulder 29 for supporting the rear cover plate 30. The rear cover plate may be secured in place by a close frictional fit between the outer edge 31 of the rear cover plate and the cylindrical surface 32, or by the use of a plurality of screw bolts 33 fastened through the rear cover plate 30 and threaded into the threaded bores 34 in the body of the casing 10.

The casing 10 is also provided with an inner chamber 35 adapted to receive the mechanism of the instrument, and the chamber 35 communicates with the space 36 between the transparent cover 24 and dial face 16, through an aperture 37 which is located to receive the moving element 38. In order to support the mechanism most firmly with a limited amount of machining operations, the chamber 35 is preferably made complementary in shape to the permanent magnet 39, which is used in the moving coil type of instrument. The permanent magnet 39 may consist of a hardened steel member of substantially U-shape and preferably substantially rectangular in cross-section, having its ends 40 and 41 located adjacent each other and adapted to resiliently engage the sides of the pole piece unit 42.

The magnet 39 may be secured in place by a plurality of screw bolts 43 which are located with their heads in recesses 44; the screw bolts 43 are threaded into threaded bores 45 in the body of casing 10. One side of each head 46 engages the lower side of the permanent magnet 39 and clamps the magnet against the relatively flat upper surface 47 in the recess 35. Since the recess 35 is complementary to the outer walls 48 of magnet 39, the magnet 39 is firmly secured by the screw bolts 43 which clamp it in the recess 35.

The present instrument is preferably provided with a pole piece unit 42 of the type shown in Fig. 5, comprising a sheet metal member of magnetic material, which is preferably formed by drawing and punching operations, thereby eliminating the usual machining operations necessary in the making of the pole pieces of the prior art. The pole piece unit 42 preferably comprises a substantially cup-shaped member having a pole piece 49 and a pole piece 50 of substantially cylindrical shape.

The pole pieces 49 and 50 are preferably joined by integral parts 51, 52 at each side and by an integral bridge 53 at the lower end, but the size of the joining portions 51—53 is such that these portions of magnetic material are readily saturated so that only a small part of the flux is short-circuited through the joining magnetic portions 51—53.

The pole pieces 49, 50 are thus separated by slots 54, 55 and by the apertures 56 in the end of the pole piece unit 42, the slots and apertures being punched out in the operation of forming the pole piece unit, and the major portion of the flux passing from the pole piece 49 to pole piece 50, or vice versa, passes through the cylindrical inner space 57.

The magnetic structure of the instrument is preferably provided with a core 58 of substantially cylindrical shape, which is located inside the pole piece unit 42 and adapted to be supported in spaced relation to the pole pieces 49 and 50 to form an annular air gap 59 through which the moving coil unit 38 rotates. The core 58 comprises a substantially cylindrical metal member formed with reduced cylindrical portions 60, 61 at each end, adapted to be received in the apertures 62, 63 in the core brackets 64, 65.

The core bracket 64 preferably comprises a sheet metal member formed by stamping or punching operations and having an annular body 66 which is adapted to embrace the reduced cylindrical end 60 of core 58, the end of the core being riveted over to secure the core bracket 64 to the core. The body 66 of core bracket 64 is provided with a radially extending arm 67 at diametrically opposite sides, and the arms 67 preferably extend upward and outward, and are provided with axially extending ends 68 which are adapted to be received in sockets 69 formed in the end 15 of the casing. The sockets 69 are so located with respect to the socket 35 for the permanent magnet 39 and with respect to the pole piece unit 42, that the upper end of the core 58 is accurately centered inside the pole piece unit 42.

The lower core bracket 65 may be provided with a body 66 of similar form, riveted on the reduced end 61 of core 58, but the body 66 of lower core bracket 65 is preferably provided with radially extending arms 70 which are adapted to be received in the slots 54 of the pole piece unit 42.

Each of the arms 70 is provided with laterally projecting lugs 71 for engaging the outside of the pole piece unit 42 at the slots 54 and the lugs 71 are adapted to prevent movement of the core 58 from side to side in the direction of the arms 70. The engagement of the arms 70 with the walls of the slots 54, prevents lateral movement of the core 58 in a direction transverse to the arms 70.

The arms 70 resiliently engage the joining portions 51 and 52 of the pole piece unit 42 and when the pole piece unit is secured in place, the core 58 is resiliently clamped in place by the portions 51, 52 pressing against arms 70 in an axial direction, thereby accurately centering and securing the core 58 in pole piece unit 42.

The body of the casing 10 is preferably formed with an annular recess 72 on the lower side of the end portion 15 surrounding the aperture 37, and the annular recess 72 is adapted to receive the outwardly extending attaching flanges 73 carried by each of the pole pieces 49 and 50. Attaching flanges 73 are preferably provided with threaded apertures 74 and the pole piece unit may be secured in the casing 10 by screw bolts 75, which extend through the upper bridge 76 and through the bores 77 in casing 10, the screw bolts 75 being threaded into the bores 74. The same screw bolts which secure the upper bridge 76 are thus adapted to secure the pole piece unit 42 in the casing and only one threading operation is required, namely, that for the bores 74. The flanges 73 are also confined in the annular space 72 by the magnet 39 which is secured in place in recess 35.

The bridge 76 comprises an elongated sheet metal member provided with a stamped tubular formation 78 located midway between its ends and provided with bores 79 for receiving the screw bolts 75. The tubular formation 78 is provided with a threaded bore 80 for receiving one of the bearing screws 81, which is provided with the usual jewel 82. A lock nut 83 secures the bearing screw 81 in adjusted position, and the bearing screw also preferably supports the insulating washers 84, 85, 86 for insulating the spring abutment plate 87 which is carried by screw 81 between the washers 84 and 86, and surrounding the washer 85.

The downwardly turned end 88 of spring abutment plate 87 is secured to the spiral spring 89 of the movable element 38 and the opposite radially projecting end 90 of spring abutment plate 87 is preferably soldered to one end of a conductor 91, the other end of the conductor being secured to the inner end of an electrical connector 92 carried by the rear cover plate 30.

The integral portion 53 of pole piece unit 42 is also adapted to serve as the lower bridge, and it is preferably formed with a centrally located body 93 having a threaded bore 94. The threaded bore 94 supports the lower bearing screw 95, which is provided with a jewel 96 and the lower bearing screw 95 supports the lower spring abutment plate 97, which is secured in place by a lock nut 98. The upwardly extending end 99 of the lower abutment plate is secured to the spiral spring 100 by soldering at 101. The lower abutment plate 97 may be provided with a radially extending portion 102 adapted to be received in the slot 55 of the pole piece unit 42, to definitely determine the proper rotative position of the lower spring abutment plate.

The instruments constructed according to the present invention, are preferably provided with a calibrating resistance 103 comprising coils of wire wound upon a spool 104, molded of phenolic condensation compound also, which may be secured between the legs of magnet 39 by a screw bolt 105, which passes through the bore 106 in spool 104 and is threaded into the threaded bore 107 in the end 15 of the casing. Where such a calibrating resistance is employed, a conductor 108 has one end soldered at 109 on the lower spring abutment plate 97, the opposite end leading to the calibrating resistance coils 103, and the opposite end of the coils 103 is connected by a conductor 110 to the other connector 92.

The two connectors 92 may be identical in form and preferably consist of short strips of metal, each having an attaching flange 111 which may be secured to the rear cover plate 30 by a tubular rivet 112. A dowel pin 113 is located in the attaching flange 111 and rear cover plate 30 to prevent rotation of the connector 92, and the tubular rivet 112 may be filled with solder in the securement of the conductors 110 or 91 to the connectors 92. The connectors 92 preferably have rearwardly projecting connector flanges 114 which are provided with apertures 115a through which the conductors pass for connection of the instrument to other circuits.

Any type of moving coil element may be employed, but the type illustrated is peculiarly adapted to give the most accurate results.

It will thus be observed that the present instrument is adapted to be provided with an annular air gap of accurate size, by the use of an improved pole piece unit which may be constructed by drawing or punching operations, as distinguished from the machining operations used in the prior devices. The present instrument is adapted to be provided with a dial which is formed integrally with the casing during the molding operation, and practically all of the parts of the instrument lend themselves readily to manufacture by stamping or molding operations, thereby reducing the amount of machining to a minimum.

The present instrument may be constructed at a materially reduced cost over the instruments of the prior art, due to the complete reorganization of the elements and improved structure of its parts, thus placing the present invention within the reach of a larger number of purchasers, but the present instrument is capable of measurements with the same or a better degree of accuracy than the instruments of the prior art, which involved an excessive amount of machine work.

The present instrument is adapted to be calibrated and its calibration resistance adjusted after the instrument is completely assembled in the casing 10, by virtue of the removable rear cover plate 30 which permits the placing of the calibration resistance last, and the permanent magnet may also be constructed at a minimum cost on account of the elimination of the annealing operations which were necessary in the devices of the prior art, in order to permit the drilling of the permanent magnet to attach the pole pieces. In the present device, the permanent magnet and pole pieces may be separately secured in the casing in contacting relation with each other, or the pole piece unit may be resiliently engaged by the legs of the magnet, without the necessity for securing the pole pieces to the ends of the magnet by screw bolts, since the pole pieces are secured in accurate spaced relation by integral joining portions of the pole piece unit.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim is new and desire to secure by Letters Patent of the United States, is:

1. A magnetic structure for electrical devices, comprising a sheet metal pole piece unit of substantially cup-shape, the pole pieces being separated by slots and joined by integral parts adapted to be saturated with flux, an integral bridge across one end adapted to support a bearing and proportioned to be saturated with flux.

2. A magnetic structure for electrical devices, comprising a sheet metal pole piece unit of substantially cup-shape, the pole pieces being separated by slots and joined by integral parts adapted to be saturated with flux, an integral bridge across one end adapted to support a bearing and porportioned to be saturated with flux, and attaching flanges carried by the edges of said pole pieces.

3. A magnetic structure for electrical devices comprising a sheet metal pole piece unit of substantially cup-shape, the pole pieces being separated by slots and joined by integral parts adapted to be saturated with flux, and a core having laterally projecting arms for engagement in said slots, and for engagement with said integral parts to determine the axial location of said core.

4. In an electrical measuring instrument, the combination of a molded insulating casing having its face end closed, with a magnetic body formed to locate pole pieces adjacent each other, said casing having a socket complementary to said body, and a plurality of screw bolts threaded into the body of said insulating casing and having their heads engaging said magnetic body to secure said body in said socket.

5. In an electrical measuring instrument, the combination of a molded insulating casing having its face end closed, with a magnetic body formed to locate pole pieces adjacent each other, said casing having a socket complementary to said body, a cup-shaped pole piece member located between and engaging the ends of said magnetic body, and common means for securing said pole piece member and magnetic body in said casing.

6. In an electrical measuring instrument, the combination of a molded insulating casing having its face end closed, with a magnetic body formed to locate pole pieces adjacent each other, said casing having a socket complementary to said body, a cup-shaped pole piece member located between and engaging the ends of said magnetic body, said pole piece member having radially projecting attaching flanges confined between the closed end of said casing and said magnetic body.

7. In an electrical measuring instrument, the combination of a molded insulating casing having its face end closed, with a magnetic body formed to locate pole pieces adjacent each other, said casing having a socket complementary to said body, a cup-shaped pole piece member located between and engaging the ends of said magnetic body, said pole piece member having radially projecting attaching flanges, a bridge piece located outside said closed end, and threaded members for mounting said bridge on said casing and engaging said attaching flanges.

8. In an electrical measuring instrument, the combination of a molded insulating casing having its face end closed, with a magnetic body formed to locate pole pieces adjacent each other, said casing having a socket complementary to said body, a cup-shaped pole piece member located between and engaging the ends of said magnetic body, said pole piece member having radially projecting attaching flanges, a bridge piece located outside said closed end, a second bridge piece being formed by the end of said pole piece member and a movable element rotatably mounted on said bridge pieces.

9. In an electrical measuring instrument, the combination of a magnet with a sheet metal pole piece unit, said pole piece unit comprising a substantially cylindrical cup-shaped member having laterally extending flanges engaging a face of said magnet, and having cylindrical portions resiliently clamped between the legs of said magnet, said cylindrical portions being joined by an integral end bridge member and by lateral integral formations to maintain said cylindrical portions in definite spaced relation to each other, said cylindrical portions having slots located between them, and a cylindrical core located in said pole piece unit and supported therein by the laterally extending arms engaging in said slots.

10. A casing for electrical instruments, comprising an insulating body of molded phenolic condensation compound having a socket in its rear side for receiving a movement and having a laterally projecting attaching flange, an insulating cover plate for closing said socket, threaded members passing through said cover plate and having direct threaded engagement with the material of said molded casing, an upwardly projecting wall carried by the other end of said casing, a transparent cover plate carried by said wall and a bezel ring engaging said cover plate and frictionally engaging the outside of said latter wall.

In witness whereof, I hereunto subscribe my name this 15th day of October, 1930.

RAY SIMPSON.